(12) United States Patent
Yiu

(10) Patent No.: US 10,779,182 B2
(45) Date of Patent: Sep. 15, 2020

(54) MEASUREMENT OBJECTS IN A NEW RADIO (NR) SYSTEM

(71) Applicant: APPLE INC., Cupertino, CA (US)

(72) Inventor: Candy Yiu, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/373,065

(22) Filed: Apr. 2, 2019

(65) Prior Publication Data

US 2019/0230550 A1    Jul. 25, 2019

Related U.S. Application Data

(60) Provisional application No. 62/658,518, filed on Apr. 16, 2018, provisional application No. 62/651,446, filed on Apr. 2, 2018.

(51) Int. Cl.
*H04W 24/10* (2009.01)
*H04W 84/04* (2009.01)

(52) U.S. Cl.
CPC .......... *H04W 24/10* (2013.01); *H04W 84/042* (2013.01)

(58) Field of Classification Search
CPC ............ H04W 72/042; H04W 72/0453; H04L 5/0007; H04L 5/001; H04L 5/0044; H04L 5/0048
See application file for complete search history.

(56) References Cited

U.S. PATENT DOCUMENTS 10,505,803 B2 * 12/2019 Liao ..................... H04L 5/0048
10,687,365 B2    6/2020 Wu

OTHER PUBLICATIONS

U.S. Appl. No. 16/408,250, Non-Final Office Action, dated Jul. 6, 2020, 8 pages.

\* cited by examiner

*Primary Examiner* — Chandrahas B Patel

(57) ABSTRACT

Technology for a user equipment (UE) operable to perform measurements for measurement objects (MOs) in a New Radio (NR) system is disclosed. The UE can identify an MO configured by an NR network in the NR system, wherein the MO is associated with a synchronization signal block (SSB) of a frequency. The UE can measure the MO associated with the SSB for the frequency. The UE can encode a measurement report for transmission to the NR network, wherein the measurement report includes one or more measurements associated with the MO.

28 Claims, 10 Drawing Sheets

```
CSI-RS-CellMobility ::=           SEQUENCE {
    cellId                        PhysCellId,
    ssbForTimingCellId            PhysCellId                       OPTIONAL,
    csi-rs-MeasurementBW          SEQUENCE {
        -- Allowed size of the measurement BW in PRBs
        -- Corresponds to L1 parameter 'CSI-RS-measurementBW-size' (see FFS_Spec, section FFS_Section)
        nrofPRBs                  ENUMERATED { size24, size48, size96, size192, size264},
        -- Starting PRB index of the measurement bandwidth
        -- Corresponds to L1 parameter 'CSI-RS-measurement-BW-start' (see FFS_Spec, section FFS_Section)
        -- FFS Value: Upper edge of value range unclear in RAN1
        startPRB                  INTEGER(0..2169)
    }, -- Frequency domain density for the 1-port CSI-RS for L3 mobility
    -- Corresponds to L1 parameter 'Density' (see FFS_Spec, section FFS_Section)
    density                       ENUMERATED {d1,d3}               OPTIONAL, -- List of resources
    csi-rs-ResourceList-Mobility  SEQUENCE (SIZE (1..maxNrofCSI-RS-ResourcesRRM)) OF CSI-RS-Resource-Mobility
}
```

FIG. 2

MEASUREMENT OBJECTS IN A NEW RADIO (NR) SYSTEM

RELATED APPLICATIONS

The present application claims the benefit of U.S. Provisional Patent Application No. 62/651,446 filed Apr. 2, 2018 and U.S. Provisional Patent Application No. 62/658,518 filed Apr. 16, 2018, the entire specifications of which are hereby incorporated by reference in their entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 is Abstract Syntax Notation One (ASN.1) code that shows an SSB for timing cell ID (ssbForTimingCellID) parameter included in a CSI-RS Cell Mobility (CSI-RS-CellMobility) information element (IE) in accordance with an example;

Figure 1:
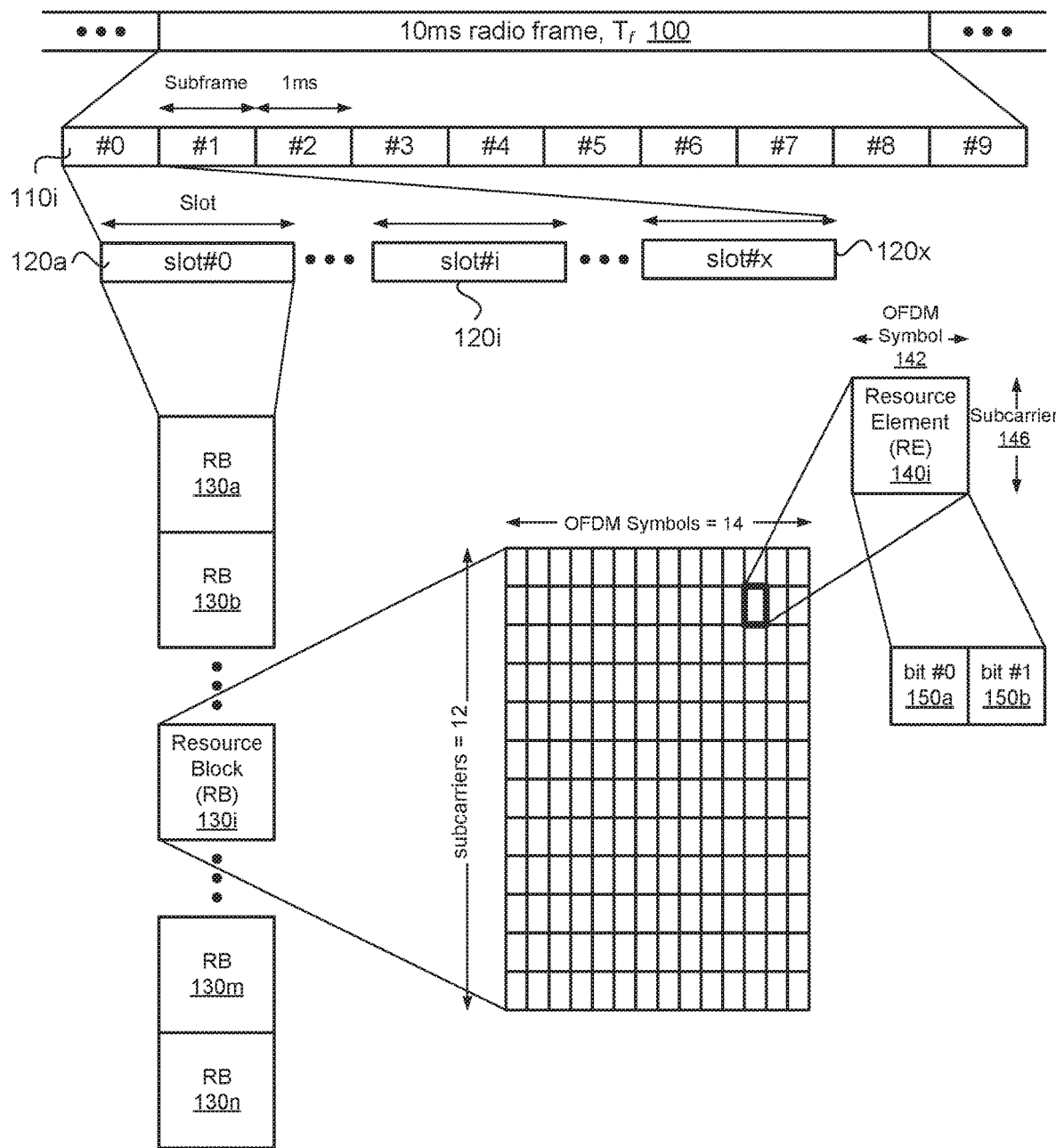
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

DEFINITIONS

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into one or multiple slots 120a, 120i, and 120x, each with a duration, $T_{slot}$, of $1/\mu$ ms, where $\mu=1$ for 15 kHz subcarrier spacing, $\mu=2$ for 30 kHz, $\mu=4$ for 60 kHz, $\mu=8$ for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140i can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

Measurement Reporting in NR System

In the current NR handover scenario, a UE can perform a measurement based on a synchronization signal block (SSB) or a channel state information reference signal (CSI-RS) of neighboring cells based on a network configuration. The UE can perform a linear average of the N best beams of each cell to evaluate a cell level quality, wherein N is a positive integer. In this case, a "best" beam can refer to a beam associated with an increased signal quality (based on the SSB and/or CSI-RS) in relation to other beams of the cell. Then, a network can configure the UE to include a beam measurement in a measurement report to assist with a random access channel (RACH) configuration.

In NR, the cells included in the measurement report can only contain triggered cells, as in LTE systems. In the NR system, a beam is a new dimension element that is not included in LTE systems. Therefore, in some cases for NR, the cell quality level may not necessarily indicate cells that contain the best beams. In this case, the UE can trigger a measurement report based on a cell that has a favorable cell level quality but only an average beam quality, where the cell having a few favorable beams may not be triggered due to the cell's average cell level quality not reaching a triggering point. Here, a "favorable" or "good" beam can refer to a beam associated with an increased signal quality (based on the SSB and/or CSI-RS) in relation to other beams, or a beam having a signal quality that is above a defined threshold. In one example, the network cannot choose the UE to handover to that cell since the cell is not a triggered cell. Therefore, the measurement report may not contain that cell.

As described in further detail below, cells containing favorable beams can be included in the measurement report. In other words, the measurement report can include cells with favorable beams, even when the cells are not triggered.

In a first configuration, the measurement report can include cells that have K favorable beams above a defined threshold, wherein K is a positive integer. In this example, K and/or the defined threshold can be configured by the network, or K and/or the defined threshold can be fixed. In one example, the defined threshold can be based on a reference signal receive power (RSRP), a reference signal received quality (RSRQ) and/or a signal-to-interference-plus-noise ratio (SINR). In addition, a beam level measurement can be Layer 1 (L1) or Layer 3 (L3) filtered.

In a second configuration, the measurement report can include a top M cells that have a highest number of beams measured above a defined threshold, wherein M is a positive integer. In this example, M can be configured by the network, and M may or may not count the cells already triggered. Here, the cells can refer to cells that are not already triggered. The defined threshold can be configured by the network, or the defined threshold can be fixed. The defined threshold can be based on a RSRP, RSRQ and/or SINR. In addition, a beam level measurement can be L1 or L3 filtered.

As a non-limiting example, cell 1 can have 5 favorable beams above the defined threshold, cell 2 can have 2 favorable beams above the defined threshold, cell 3 can have 10 favorable beams above the defined threshold, cell 4 can have 1 favorable beam above the defined threshold, cell 5 can have 6 favorable beams above the defined threshold, and cell 6 can have no favorable beams above the defined threshold. In this example, cell 1 can be the triggered cell and no other cells can be triggered at this point. When the first configuration is used, if K is equal to 4, then the UE can include cell 1, cell 3 and cell 5 in the measurement report. When the second configuration is used, if M is equal to 2, then the UE can include cell 3 and cell 5 in the measurement report. In addition, the measurement report can also include the beam measurement of non-triggered cells.

Measurement Objects in NR System

With respect to measurement objects (MOs) in an NR system, in one example, there can be one NR Absolute Radio Frequency Channel Number (NR-ARFCN) per MO. In general, an MO can include a list of cells (and their frequencies of operation) on which measurements are to be performed. In another example, for measurements of a carrier where a synchronization signal block (SSB) is not present (e.g., measurements are performed based on a channel state information reference signal (CSI-RS)), the MO can include CSI-RS resources for Layer 3 (L3) mobility measurements, and the MO can include an indication that no SSB is provided on the carrier. In addition, the UE can acquire timing references for making measurements for the carrier. For example, the UE can assume a timing reference from one of its serving carriers (in a carrier aggregation scenario), or the MO can include a pointer to another carrier with an SSB for obtaining the timing reference. In yet another example, for measurements of carrier where an SSB is present, when the SSB is not located in a center of the carrier, an offset to the ARFCN can provide a location in frequency of the SSB within the carrier. In one example, the MO can have only one SSB, or alternatively, the MO can include the location of more than one SSB. In addition, the above examples relate to a single bandwidth part (BWP), in which case the NR ARFCN can be at the center of the BWP, or the above examples relate to multiple BWPs.

In one example, with respect to MOs in the NR system, an SSB subcarrier spacing can be configured in the MO. In addition, an SSB configuration used for a timing reference can be provided in the MO where only a CSI-RS based radio resource management (RRM) measurement is performed.

In one example, a UE can determine which MO corresponds to a serving frequency (or a non-serving frequency) from a frequency location of a cell-defining SSB (CD-SSB) that is contained within a serving cell configuration. In another example, more than one MO with CSI-RS resources for measurement can be associated to a same SSB location in frequency, and the SSB can be at least used for timing reference. In yet another example, when more than one MO with CSI-RS resources for measurement is associated to the same SSB location in frequency, the UE can receive an indication regarding which MO corresponds to the serving carrier. The indication can be included in the MO or in the serving cell configuration.

In one example, a BWP operation can have an impact on a CONNECTED mode, as well as on idle/inactive mode UEs. In one example, radio resource control (RRC) signaling can be used to configure one or more BWPs (e.g., both for DL BWP and UL BWP) for a serving cell, such as a primary cell (PCell) or a primary secondary cell (PSCell). In one example, RRC signaling can be used to configure zero, one or more BWPs (both for DL BWP and UL BWP) for a serving cell, such as a secondary cell (SCell) (at least one DL BWP), which can be impacted by a supplementary uplink (SUL). In one example, for a UE, the PCell, the PSCell and each SCell can each have a single associated SSB in frequency, which can be referred to as an CD-SSB. In one example, a cell defining SS block can be changed by a synchronous reconfiguration from the PCell/PSCell and a SCell release/add for the SCell. In one example, each SS block frequency to be measured by the UE can be configured as an individual measurement object (i.e., one measurement object can correspond to a single SS block frequency). In one example, a cell defining SS block can be considered as a time reference of the serving cell, and for RRM serving cell measurements based on an SSB (irrespective of which BWP is activated).

In one example, within an MO, an SSB location can be indicated with a global synchronization channel number (GSCN) with no additional offset, and in some cases, a subcarrier offset as well. In one example, for an MO with a CSI-RS, an NR-ARFCN can be used to indicate a frequency reference, where a location of the CSI-RS can be relative to frequency reference. In one example, an SSB location can be indicated with the GSCN for a reconfiguration with sync (e.g., for inter-frequency handover and a secondary cell group (SCG) change) and for configuration of SCells. The reconfiguration can also provide an NR-ARFCN, and in some cases, a subcarrier offset as well. In another example, for idle/inactive reselection and reselection from LTE to NR, the SSB location can be indicated with a GSCN with no additional offset.

As described in further detail below, a UE behavior can be defined when multiple measurement objects (MOs) are configured on a same carrier frequency. The MOs can be configured using RRC signaling.

In one configuration, there can be three types of synchronization signal blocks (SSBs) in the measurement object (MMO) in an NR system. A first type (Type 1) can be a cell defining SSB in a MO. In the first type, the UE can use the cell defining SSB as a timing reference for a CSI-RS when configured for a same cell identifier (ID). A second type (Type 2) can be an SSB for timing reference in a MO for a CSI-RS measurement. In the second type, when a CSI-RS is configured and no corresponding cell defining SSB is configured, a network can configure an SSB (of another cell) as a timing reference for the CSI-RS. In this case, which SSB is configured for this purpose may not be provided in an information element (IE). A third type (Type 3) can be no SSB in a MO. When no SSB is in the MO, the UE can reuse a serving cell for a timing reference. However, the UE can have multiple serving cells, and one of the serving cells can be used by the UE for the CSI-RS timing reference when configured.

In one example, for the second type and the third type, previous solutions do not specify which SSB is to be used by the UE for a timing reference when a cell defining SSB for a same cell ID as the CSI-RS is not provided. Therefore, for the second type and the third type, an SSB for timing cell iD (ssbForTimingCellID) parameter can be included in a CSI-RS Cell Mobility (CSI-RS-CellMobility) information element (IE), which can indicate to a UE a particular SSB to be used for the timing reference.

FIG. 2 is an example of Abstract Syntax Notation One (ASN.1) code that shows an SSB for timing cell ID (ssbForTimingCellID) parameter included in a CSI-RS Cell Mobility (CSI-RS-CellMobility) information element (IE). The ssbForTimingCellID parameter can be included in the CSI-RS-CellMobility IE to indicate to a UE a particular SSB to be used for a timing reference. In particular, the ssbForTimingCellID parameter can be included in the CSI-RS-CellMobility IE for a second type (Type 2) of SSB and a third type (Type 3) of SSB. In addition, the ssbForTimingCellID can be associated with a physical cell ID (PhysCellId).

In one example, multiple MOs can be configured for a same carrier frequency. There are several use cases for allowing multiple MOs to be configured on the same carrier frequency. For example, in a first scenario, there can be an SSB on different BWPs so a UE does not have to perform intra-frequency measurements with a measurement gap. In general, the measurement gap is a period of time during which the UE does not transmit or receive signals, but rather performs signal quality measurements. For example, a first MO (MO1) and a second MO (MO2) can be configured and an SSB can be measured within a first BWP (BWP1) and a second BWP (BWP2). In a second scenario, there can be multiple CSI-RS configurations on a different narrower carrier within a non-serving frequency. In a third scenario, there can be multiple CSI-RS configurations within a same BWP.

Figure 3:
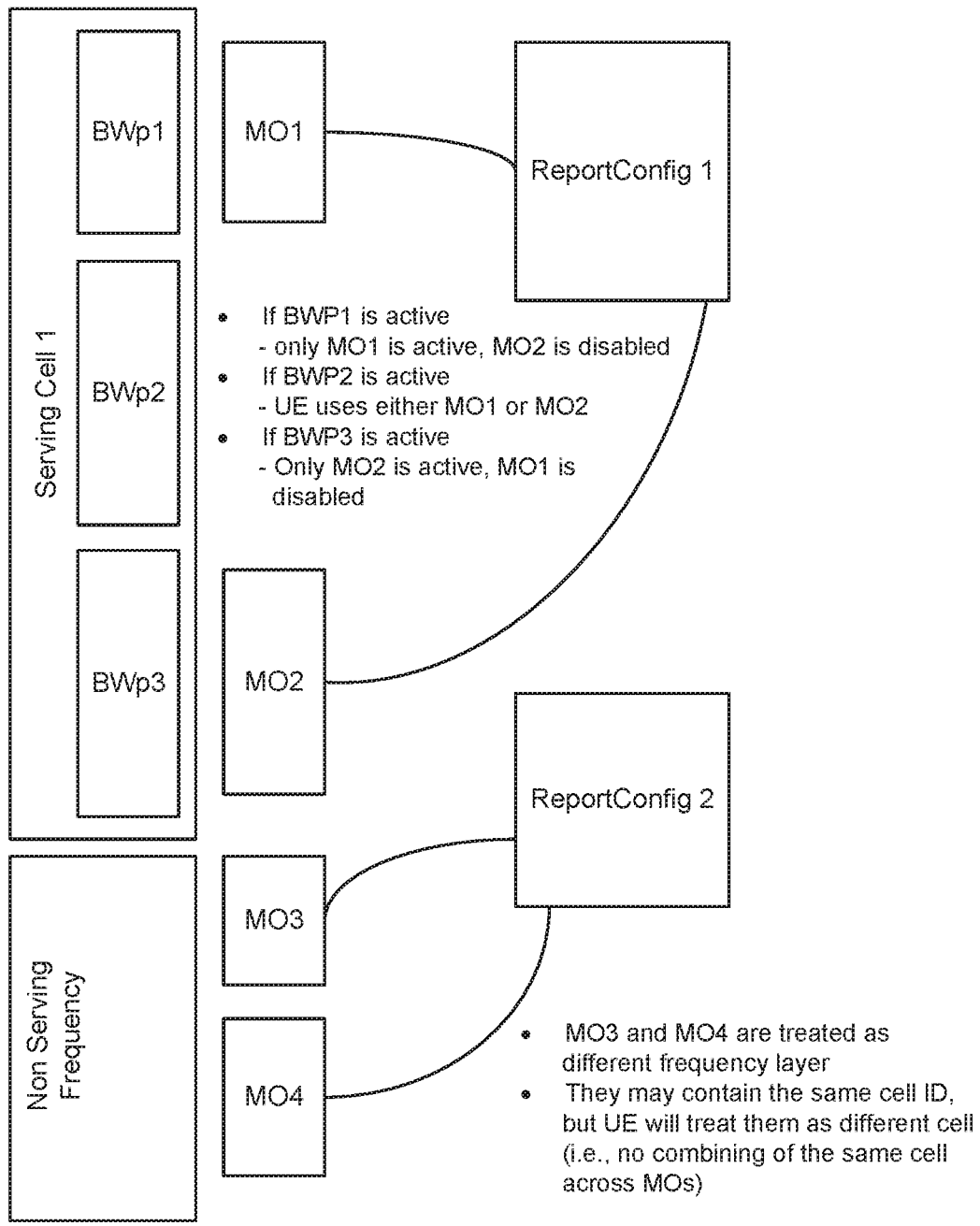
FIG. 3 illustrates multiple measurement objects (MOs) for a serving frequency and a non-serving frequency in accordance with an example.

FIG. 3 illustrates an example of multiple measurement objects (MOs) for a serving frequency and a non-serving frequency. For example, a first MO (MO1) and a second MO (MO2) can include an SSB configuration for a first BWP (BWP1) and a third BWP (BWP3), respectively, which can allow a UE to measure a serving cell without a measurement gap. For example, when BWP1 is active, the UE can perform a measurement using MO1. When the network switches the UE to BWP3, the UE can perform a measurement using MO2 without a measurement gap. However, if BWP2 is active and there is no SSB on BWP2, the UE can measure the serving cell using a measurement gap.

However, in previous solutions, if the network configures two measurement objects on each BWP, the UE can measure both measurement objects. In this case, the purpose of having the UE perform the measurement with the measurement gap cannot be achieved. Therefore, in the current solution, the UE may not measure the measurement object on non-active BWP if there is a measurement object on a current active BWP. In case the UE is to perform a measurement on all MOs, then there is no reason to configure multiple MO in the first scenario (i.e., when there is an SSB on different BWPs so a UE does not have to perform intra-frequency measurements with a measurement gap).

As shown in FIG. 3, when BWP1 is active, MO1 can be active and MO2 can be disabled. When BWP2 is active, the UE can perform a measurement using either MO1 or MO2. When BWP3 is active, MO2 can be active and MO1 can be disabled. Here, BWP1, BWP2 and BWP3 can be associated with a first serving cell (Serving cell 1), and MO1 and MO2 can be associated with a first report configuration (ReportConfig1). In addition, a third MO (MO3) and a fourth MO 9MO4) can be treated as being on a different frequency layer (e.g., a non-serving frequency). MO3 and MO4 can contain a same cell ID, but the UE can treat MO3 and MO4 as being on different cells (i.e., no combining of the same cell across MOs). Here, MO3 and MO4 can be associated with a second report configuration (ReportConfig2).

In one configuration, multiple SSB (and therefore multiple MOs on the same frequency) on different BWPs can benefit the UE performing a measurement on a serving cell using a measurement gap. For example, in a first option, multiple MOs can be configured for multiple SSBs on different BWPs on the same serving frequency and the UE can only measure an MO associated with an active BWP. In the case that there is no MO associated to the active BWP, the UE can choose any BWP to measure for that frequency. In a second option, only one MO can be configured for an SSB on the same serving frequency.

In one example, with respect to the second scenario (i.e., when there are multiple CSI-RS configurations on a different narrower carrier within a non-serving frequency), the network can configure multiple CSI-RSs on different BWPs for a same serving frequency, which can enable switching BWPs. However, a beam management configuration can be separate from radio resource management (RRM), and there can already be a CSI resource configuration (CSI-ResourceConfig) for configuration of beam management for this purpose. Therefore, this might not be a valid use case.

In one configuration, with respect to the second scenario (i.e., when there are multiple CSI-RS configurations on a different narrower carrier within a non-serving frequency), the network configuring multiple CSI-RSs on different BWPs for a same serving frequency can already be done in beam management. Therefore, this might not be a valid use case.

In one configuration, only a single MO for a CSI-RS configuration on a same serving frequency can be configured. With respect to the third scenario (i.e., when there are multiple CSI-RS configurations within a same BWP), the network can configure multiple CSI-RS on different BW for a non-serving frequency. For example, the network can check which BWP is best for the UE after handover, which can be an optimization for speeding up the handover process to the best BWP. The UE can perform a certain behavior when there are multiple MOs for the same frequency with the same cell ID. For example, the UE can combine measurements to perform a cell measurement, or the UE can consider the presence of different carriers and hence different cells. In one example, a single MO for a CSI-RS on a non-serving frequency can be used, or the UE can consider different MOs as different carriers, and hence different cells (i.e., no combining of measurements for a same cell across different MOs) in case multiple MOs are configured on the same frequency for the CSI-RS.

In one example, with respect to the third scenario (i.e., when there are multiple CSI-RS configurations within a same BWP), the network can configure multiple CSI-RSs on different BWs for a non-serving frequency, which can be considered an optimization for handover purposes.

In one option, multiple MOs can be configured for multiple CSI-RSs on different BWPs on a same non-serving frequency, and the UE can consider each MO as in a different carrier (i.e., same cell ID across different MOs may not be combined). In another option, only one MO can be configured for a CSI-RS on a same non-serving frequency.

In one example, a 1-bit indication can be added in a CSI-RS-CellMobility IE to indicate which SSB is used for a timing reference. In another example, a carrier frequency can be added in a MO to identify the MO. In yet another example, multiple MOs can be configured for multiple SSBs on different BWPs on a same serving frequency, and a UE can only measure an MO associated to an active BWP. When there is no MO associated to the active BWP, the UE can select a BWP to measure for that serving frequency.

In one example, only one MO can be configured for an SSB on a same frequency. In another example, only a single MO for a CSI-RS configuration on a same serving frequency can be configured. In yet another example, multiple MOs can be configured for multiple CSI-RSs on different BWPs on a same non serving frequency, and a UE can consider each MO as in a different carrier (i.e., a same cell ID across different MOs may not be combined). In addition, only one MO can be configured for a CSI-RS on a same serving frequency.

Figure 4:
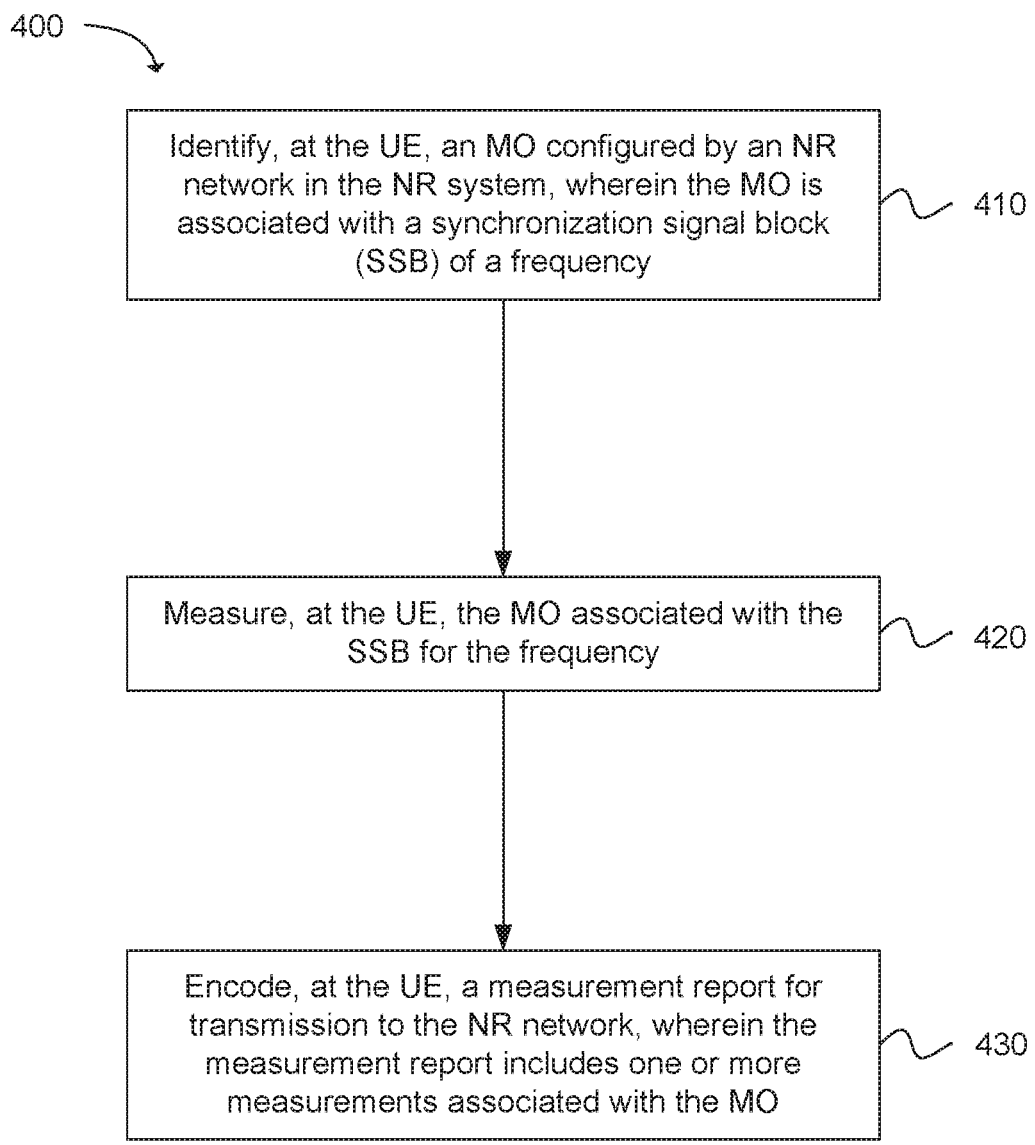
FIG. 4 depicts functionality of a user equipment (UE) operable to perform measurements for measurement objects (MOs) in a New Radio (NR) system in accordance with an example.

Another example provides functionality 400 of a user equipment (UE) operable to perform measurements for measurement objects (MOs) in a New Radio (NR) system, as shown in FIG. 4. The UE can comprise one or more processors configured to identify, at the UE, an MO configured by an NR network in the NR system, wherein the MO is associated with a synchronization signal block (SSB) of a frequency, as in block 410. The UE can comprise one or more processors configured to measure, at the UE, the MO associated with the SSB for the frequency, as in block 420. The UE can comprise one or more processors configured to encode, at the UE, a measurement report for transmission to the NR network, wherein the measurement report includes one or more measurements associated with the MO, as in block 430. In addition, the UE can comprise a memory interface configured to send to a memory a configuration of the MO.

Figure 5:
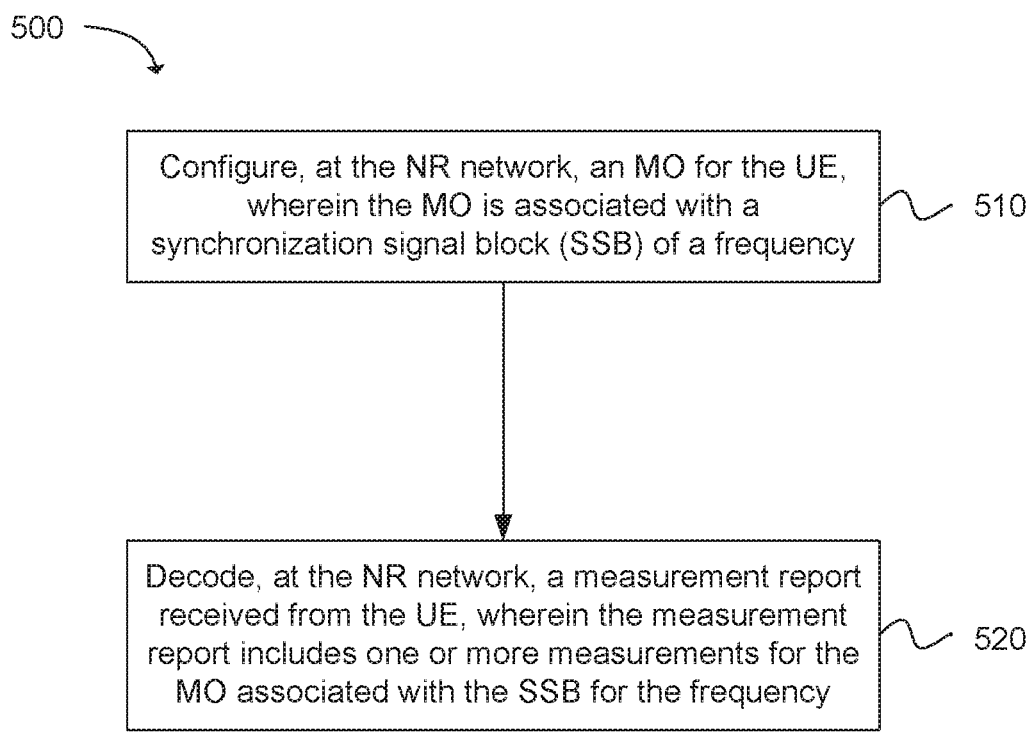
FIG. 5 depicts functionality of a New Radio (NR) network operable to decode measurements for measurement objects (MOs) received from a user equipment (UE) in accordance with an example.

Another example provides functionality 500 of a New Radio (NR) network operable to decode measurements for measurement objects (MOs) received from a user equipment (UE), as shown in FIG. 5. The NR network can comprise one or more processors configured to configure, at the NR network, an MO for the UE, wherein the MO is associated with a synchronization signal block (SSB) of a frequency, as in block 510. The NR network can comprise one or more processors configured to decode, at the NR network, a measurement report received from the UE, wherein the measurement report includes one or more measurements for the MO associated with the SSB for the frequency, as in block 520. In addition, the NR network can comprise a memory interface configured to send to a memory the measurement report.

Figure 6:
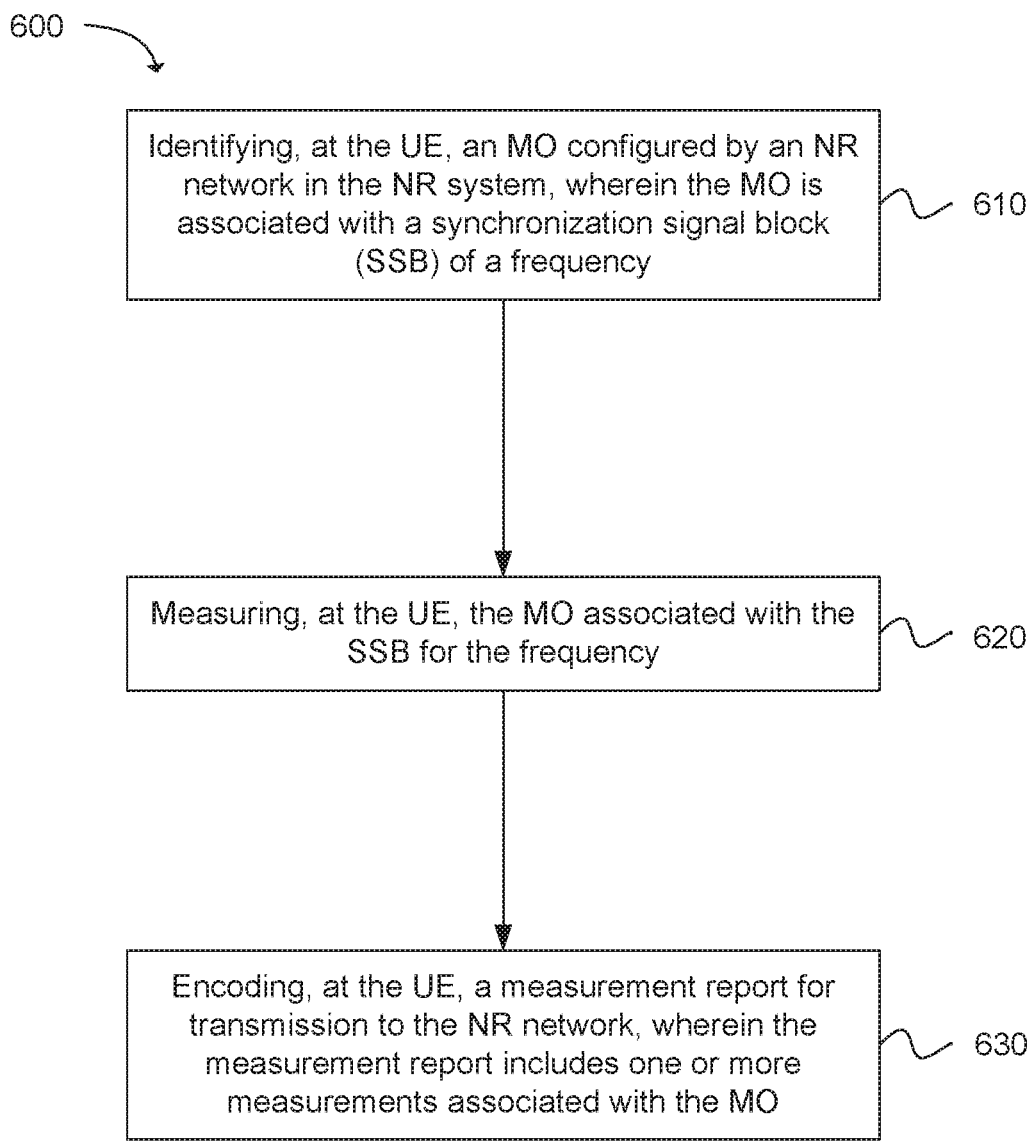
FIG. 6 depicts a flowchart of a machine readable storage medium having instructions embodied thereon for performing measurements for measurement objects (MOs) in a New Radio (NR) system in accordance with an example.

Another example provides at least one machine readable storage medium having instructions 600 embodied thereon for performing measurements for measurement objects (MOs) in a New Radio (NR) system, as shown in FIG. 6. The instructions can be executed on a machine, where the instructions are included on at least one computer readable medium or one non-transitory machine readable storage medium. The instructions when executed by one or more processors of a user equipment (UE) perform: identifying, at the UE, an MO configured by an NR network in the NR system, wherein the MO is associated with a synchronization signal block (SSB) of a frequency, as in block 610. The instructions when executed by one or more processors of the UE perform: measuring, at the UE, the MO associated with the SSB for the frequency, as in block 620. The instructions when executed by one or more processors of the UE perform: encoding, at the UE, a measurement report for transmission to the NR network, wherein the measurement report includes one or more measurements associated with the MO, as in block 630.

Figure 7:
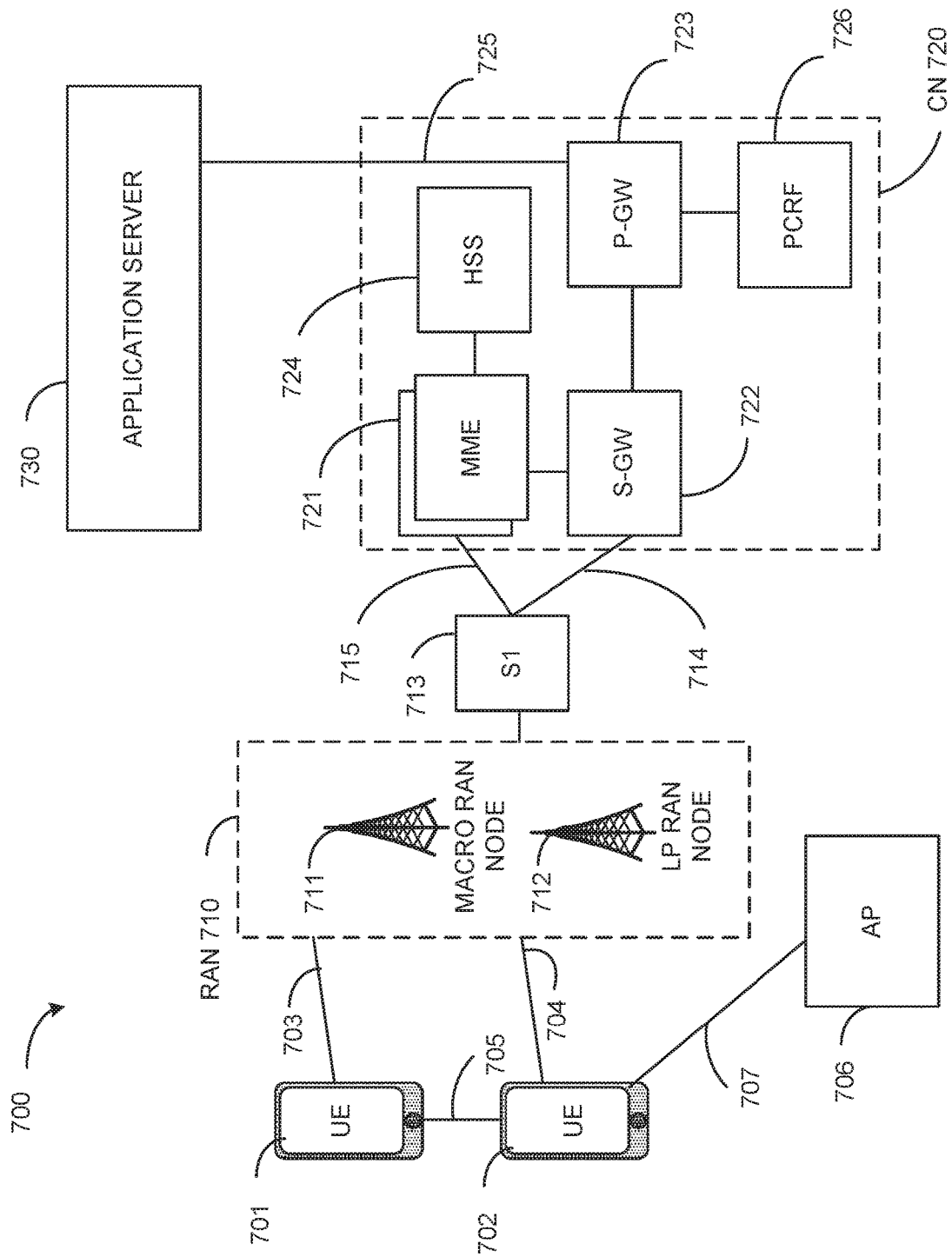
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724.

The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate a SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
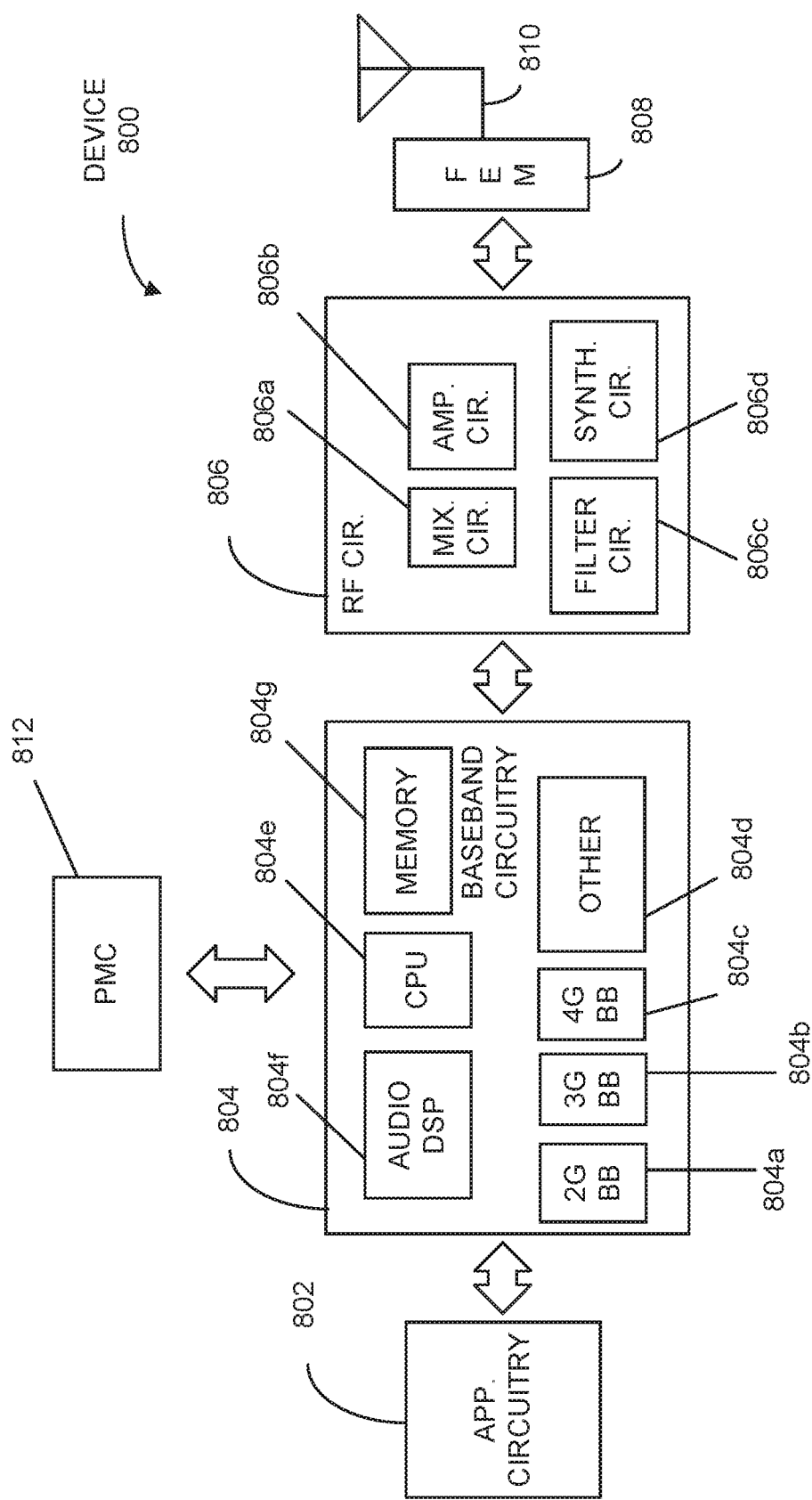
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804*a*, a fourth generation (4G) baseband processor 804*b*, a fifth generation (5G) baseband processor 804*c*, or other baseband processor(s) 804*d* for other existing generations, generations in development or to be developed in the future (e.g., second generation (2G), sixth generation (6G), etc.). The baseband circuitry 804 (e.g., one or more of baseband processors 804*a-d*) may handle various radio control functions that enable communication with one or more radio networks via the RF circuitry 806. In other embodiments, some or all of the functionality of baseband processors 804*a-d* may be included in modules stored in the memory 804*g* and executed via a Central Processing Unit (CPU) 804*e*. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804*f*. The audio DSP(s) 804*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806*a*, amplifier circuitry 806*b* and filter circuitry 806*c*. In some embodiments, the transmit signal path of the RF circuitry 806 may include filter circuitry 806*c* and mixer circuitry 806*a*. RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by synthesizer circuitry 806*d*. The amplifier circuitry 806*b* may be configured to amplify the down-converted signals and the filter circuitry 806*c* may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals. In some embodiments, mixer circuitry 806*a* of the receive signal path may comprise passive mixers, although the scope of the embodiments is not limited in this respect.

In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by filter circuitry 806*c*.

In some embodiments, the mixer circuitry 806*a* of the receive signal path and the mixer circuitry 806*a* of the transmit signal path may include two or more mixers and may be arranged for quadrature downconversion and upconversion, respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO). Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it can transition back to RRC_Connected state.

An additional power saving mode may allow a device to be unavailable to the network for periods longer than a paging interval (ranging from seconds to a few hours). During this time, the device can be unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
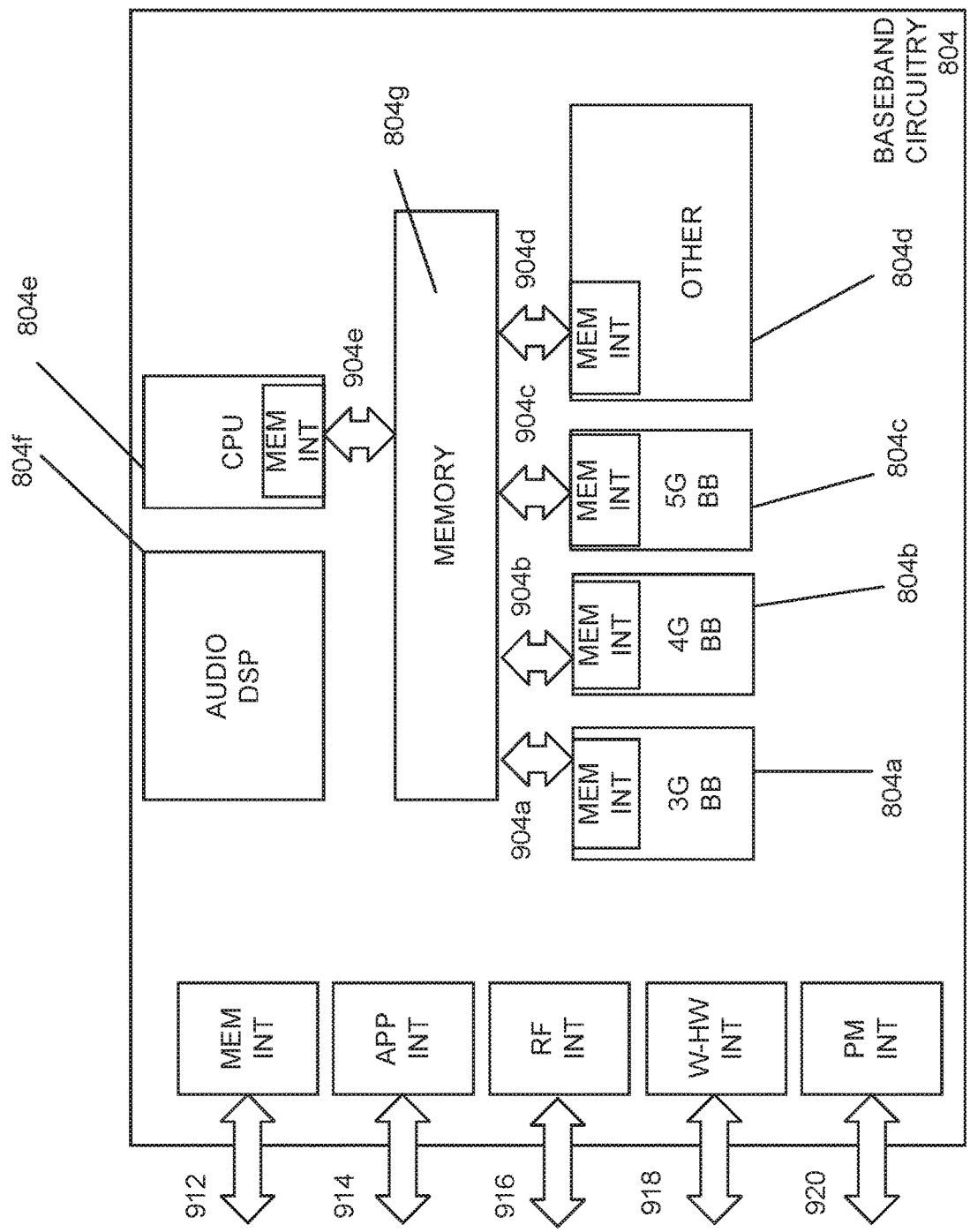
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804a-804e and a memory 804g utilized by said processors. Each of the processors 804a-804e may include a memory interface, 904a-904e, respectively, to send/receive data to/from the memory 804g.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
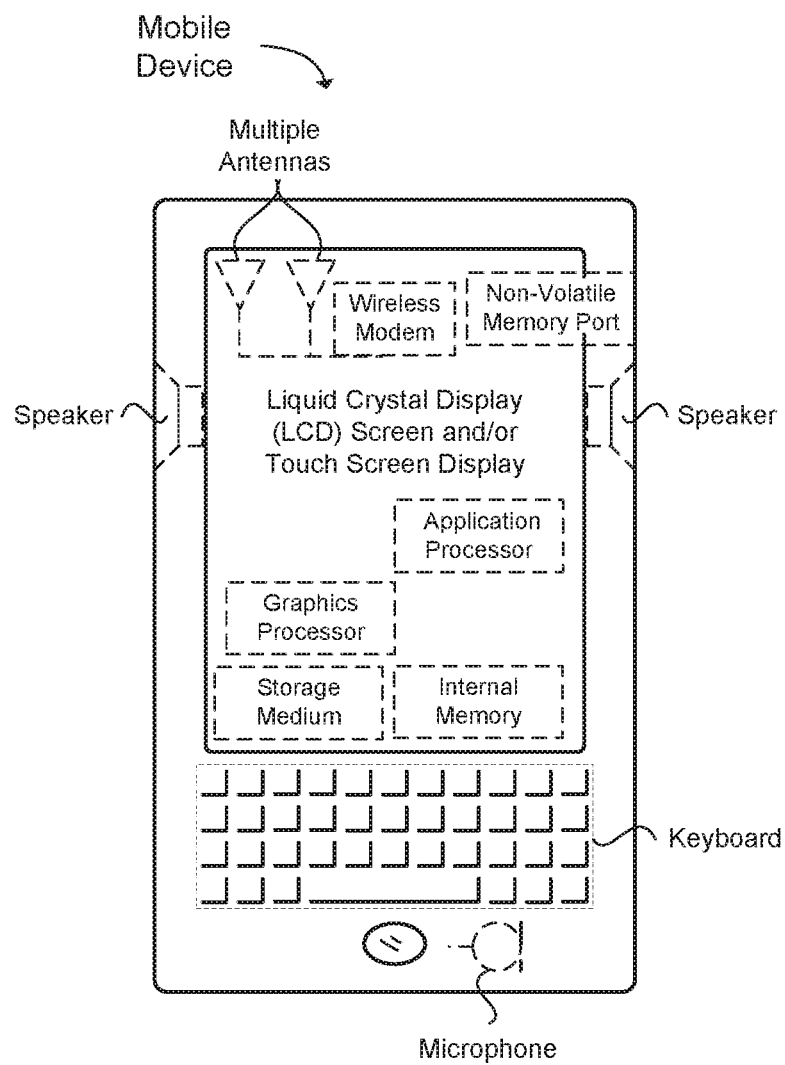
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to perform measurements for measurement objects (MOs) in a New Radio (NR) system, the UE comprising: one or more processors configured to: identify, at the UE, an MO configured by an NR network in the NR system, wherein the MO is associated with a synchronization signal block (SSB) of a frequency; measure, at the UE, the MO associated with the SSB for the frequency; and encode, at the UE, a measurement report for transmission to the NR network, wherein the measurement report includes one or more measurements associated with the MO; and a memory interface configured to send to a memory a configuration of the MO.

Example 2 includes the apparatus of Example 1, further comprising a transceiver configured to receive the configuration of the MO from the NR network.

Example 3 includes the apparatus of any of Examples 1 to 2, wherein the one or more processors are configured to identify the MO from multiple MOs that are configured by the NR network in the NR system, wherein the multiple MOs are associated with multiple SSBs on separate bandwidth parts (BWPs) of the frequency.

Example 4 includes the apparatus of any of Examples 1 to 3, wherein the one or more processors are configured to measure the MO associated with an active BWP of the separate BWPs of the frequency.

Example 5 includes the apparatus of any of Examples 1 to 4, wherein the one or more processors are configured to select a BWP of the separate BWPs on the frequency to measure when no MO included in the multiple MOs is associated with an active BWP.

Example 6 includes the apparatus of any of Examples 1 to 5, wherein the SSB is a cell defining SSB.

Example 7 includes the apparatus of any of Examples 1 to 6, wherein the frequency is a serving frequency or a non-serving frequency.

Example 8 includes the apparatus of any of Examples 1 to 6, wherein the MO is a single MO that is configured for one frequency.

Example 9 includes the apparatus of any of Examples 1 to 8, wherein the SSB is used as a timing reference by the UE for a channel state information reference signal (CSI-RS).

Example 10 includes an apparatus of a New Radio (NR) network operable to decode measurements for measurement objects (MOs) received from a user equipment (UE), the NR network comprising: one or more processors configured to: configure, at the NR network, an MO for the UE, wherein the MO is associated with a synchronization signal block (SSB) of a frequency; and decode, at the NR network, a measurement report received from the UE, wherein the measurement report includes one or more measurements for the MO associated with the SSB for the frequency; and a memory interface configured to send to a memory the measurement report.

Example 11 includes the apparatus of Example 10, further comprising a transceiver configured to: transmit a configuration of the MO to the UE; and receive the measurement report from the UE.

Example 12 includes the apparatus of any of Examples 10 to 11, wherein the MO is one of multiple MOs that are configured by the NR network, wherein the multiple MOs are associated with multiple SSBs on separate bandwidth parts (BWPs) of the frequency.

Example 13 includes the apparatus of any of Examples 10 to 12, wherein the MO associated with an active BWP of the separate BWPs of the frequency is measured at the UE.

Example 14 includes the apparatus of any of Examples 10 to 13, wherein a BWP of the separate BWPs on the frequency is selected to measure at the UE when no MO included in the multiple MOs is associated with an active BWP.

Example 15 includes the apparatus of any of Examples 10 to 14, wherein the SSB is a cell defining SSB.

Example 16 includes the apparatus of any of Examples 10 to 15, wherein the frequency is a serving frequency or a non-serving frequency.

Example 17 includes the apparatus of any of Examples 10 to 16, wherein the MO is a single MO that is configured for one frequency.

Example 18 includes the apparatus of any of Examples 10 to 17, wherein the SSB is used as a timing reference by the UE for a channel state information reference signal (CSI-RS).

Example 19 includes at least one non-transitory machine readable storage medium having instructions embodied thereon for performing measurements for measurement objects (MOs) in a New Radio (NR) system, the instructions when executed by one or more processors at a user equipment (UE) perform the following: identifying, at the UE, an MO configured by an NR network in the NR system, wherein the MO is associated with a synchronization signal block (SSB) of a frequency; measuring, at the UE, the MO associated with the SSB for the frequency; and encoding, at the UE, a measurement report for transmission to the NR network, wherein the measurement report includes one or more measurements associated with the MO.

Example 20 includes the at least one non-transitory machine readable storage medium of Example 19, further comprising instructions when executed perform the following: identifying the MO from multiple MOs that are configured by the NR network in the NR system, wherein the multiple MOs are associated with multiple SSBs on separate bandwidth parts (BWPs) of the frequency.

Example 21 includes the at least one non-transitory machine readable storage medium of any of Examples 19 to 20, further comprising instructions when executed perform the following: measuring the MO associated with an active BWP of the separate BWPs of the frequency.

Example 22 includes the at least one non-transitory machine readable storage medium of any of Examples 19 to 21, further comprising instructions when executed perform the following: selecting a BWP of the separate BWPs on the frequency to measure when no MO included in the multiple MOs is associated with an active BWP.

Example 23 includes the at least one non-transitory machine readable storage medium of any of Examples 19 to 22, wherein the frequency is a serving frequency or a non-serving frequency.

Example 24 includes the at least one non-transitory machine readable storage medium of any of Examples 19 to 23, wherein the MO is a single MO that is configured for one frequency.

Example 25 includes an apparatus of a user equipment (UE) operable to encode a measurement report for transmission to a New Radio (NR) base station, the UE comprising: one or more processors configured to: determine, at the UE, one or more NR cells that have K beams that are above a first defined threshold, wherein K is a positive integer; determine, at the UE, M NR cells that have an increased number of beams measured above a second defined threshold, wherein M is a positive integer; and encode, at the UE, a measurement report for transmission to the NR base station that includes measurements for the one or more NR cells that have K beams that are above the first defined threshold or the M NR cells that have the increased number of beams measured above the second defined threshold, a memory interface configured to retrieve from a memory the measurement report.

Example 26 includes the apparatus of Example 25, wherein: one or more of K and the first defined threshold are configured by an NR network; and one or more of M and the second defined threshold are configured by the NR network.

Example 27 includes the apparatus of any of Examples 25 to 26, wherein: one or more of K and the first defined threshold are fixed values; and one or more of M and the second defined threshold are fixed values.

Example 28 includes the apparatus of any of Examples 25 to 27, wherein the first defined threshold and the second defined threshold are based on one of: a reference signal receive power (RSRP), a reference signal received quality (RSRQ) and/or a signal-to-interference-plus-noise ratio (SINR).

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to perform measurements for measurement objects (MOs) in a New Radio (NR) system, the UE comprising:
    one or more processors configured to:
        identify, at the UE, an MO configured by an NR network in the NR system, wherein the MO is associated with a synchronization signal block (SSB) of a frequency;
        measure, at the UE, the MO associated with the SSB for the frequency; and
        encode, at the UE, a measurement report for transmission to the NR network, wherein the measurement report includes one or more measurements associated with the MO; and
    a memory interface configured to send to a memory a configuration of the MO.

2. The apparatus of claim 1, further comprising a transceiver configured to receive the configuration of the MO from the NR network.

3. The apparatus of claim 1, wherein the one or more processors are configured to identify the MO from multiple MOs that are configured by the NR network in the NR system, wherein the multiple MOs are associated with multiple SSBs on separate bandwidth parts (BWPs) of the frequency.

4. The apparatus of claim 3, wherein the one or more processors are configured to measure the MO associated with an active BWP of the separate BWPs of the frequency.

5. The apparatus of claim 3, wherein the one or more processors are configured to select a BWP of the separate BWPs on the frequency to measure when no MO included in the multiple MOs is associated with an active BWP.

6. The apparatus of claim 1, wherein the SSB is a cell defining SSB.

7. The apparatus of claim 1, wherein the frequency is a serving frequency or a non-serving frequency.

8. The apparatus of claim 1, wherein the MO is a single MO that is configured for one frequency.

9. The apparatus of claim 1, wherein the SSB is used as a timing reference by the UE for a channel state information reference signal (CSI-RS).

10. An apparatus of a New Radio (NR) network operable to decode measurements for measurement objects (MOs) received from a user equipment (UE), the NR network comprising:
one or more processors configured to:
configure, at the NR network, an MO for the UE, wherein the MO is associated with a synchronization signal block (SSB) of a frequency; and
decode, at the NR network, a measurement report received from the UE, wherein the measurement report includes one or more measurements for the MO associated with the SSB for the frequency; and
a memory interface configured to send to a memory the measurement report.

11. The apparatus of claim 10, further comprising a transceiver configured to:
transmit a configuration of the MO to the UE; and
receive the measurement report from the UE.

12. The apparatus of claim 10, wherein the MO is one of multiple MOs that are configured by the NR network, wherein the multiple MOs are associated with multiple SSBs on separate bandwidth parts (BWPs) of the frequency.

13. The apparatus of claim 12, wherein the MO associated with an active BWP of the separate BWPs of the frequency is measured at the UE.

14. The apparatus of claim 12, wherein a BWP of the separate BWPs on the frequency is selected to measure at the UE when no MO included in the multiple MOs is associated with an active BWP.

15. The apparatus of claim 10, wherein the SSB is a cell defining SSB.

16. The apparatus of claim 10, wherein the frequency is a serving frequency or a non-serving frequency.

17. The apparatus of claim 10, wherein the MO is a single MO that is configured for one frequency.

18. The apparatus of claim 10, wherein the SSB is used as a timing reference by the UE for a channel state information reference signal (CSI-RS).

19. At least one non-transitory machine readable storage medium having instructions embodied thereon for performing measurements for measurement objects (MOs) in a New Radio (NR) system, the instructions when executed by one or more processors at a user equipment (UE) perform the following:
identifying, at the UE, an MO configured by an NR network in the NR system, wherein the MO is associated with a synchronization signal block (SSB) of a frequency;
measuring, at the UE, the MO associated with the SSB for the frequency; and
encoding, at the UE, a measurement report for transmission to the NR network, wherein the measurement report includes one or more measurements associated with the MO.

20. The at least one non-transitory machine readable storage medium of claim 19, further comprising instructions when executed perform the following: identifying the MO from multiple MOs that are configured by the NR network in the NR system, wherein the multiple MOs are associated with multiple SSBs on separate bandwidth parts (BWPs) of the frequency.

21. The at least one non-transitory machine readable storage medium of claim 20, further comprising instructions when executed perform the following: measuring the MO associated with an active BWP of the separate BWPs of the frequency.

22. The at least one non-transitory machine readable storage medium of claim 20, further comprising instructions when executed perform the following: selecting a BWP of the separate BWPs on the frequency to measure when no MO included in the multiple MOs is associated with an active BWP.

23. The at least one non-transitory machine readable storage medium of claim 19, wherein the frequency is a serving frequency or a non-serving frequency.

24. The at least one non-transitory machine readable storage medium of claim 19, wherein the MO is a single MO that is configured for one frequency.

25. An apparatus of a user equipment (UE) operable to encode a measurement report for transmission to a New Radio (NR) base station, the UE comprising:
one or more processors configured to:
determine, at the UE, one or more NR cells that have K beams that are above a first defined threshold, wherein K is a positive integer;
determine, at the UE, M NR cells that have an increased number of beams measured above a second defined threshold, wherein M is a positive integer; and
encode, at the UE, a measurement report for transmission to the NR base station that includes measurements for the one or more NR cells that have K beams that are above the first defined threshold or the M NR cells that have the increased number of beams measured above the second defined threshold,
a memory interface configured to retrieve from a memory the measurement report.

26. The apparatus of claim 25, wherein:
one or more of K and the first defined threshold are configured by an NR network; and
one or more of M and the second defined threshold are configured by the NR network.

27. The apparatus of claim 25, wherein:
one or more of K and the first defined threshold are fixed values; and
one or more of M and the second defined threshold are fixed values.

28. The apparatus of claim 25, wherein the first defined threshold and the second defined threshold are based on one of: a reference signal receive power (RSRP), a reference signal received quality (RSRQ) and/or a signal-to-interference-plus-noise ratio (SINR).

* * * * *